Jan. 21, 1941.  J. E. HALL  2,229,076
ROLLER BEARING
Filed Dec. 21, 1938
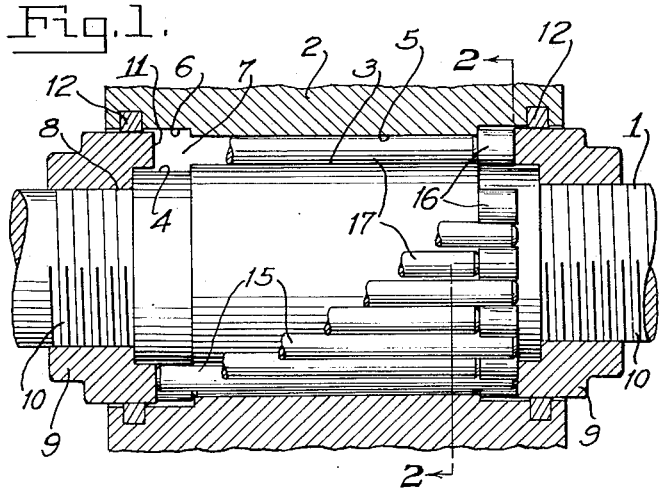
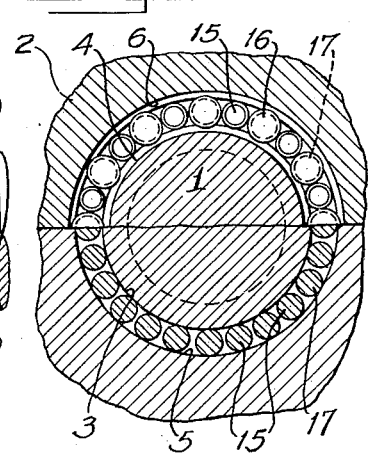
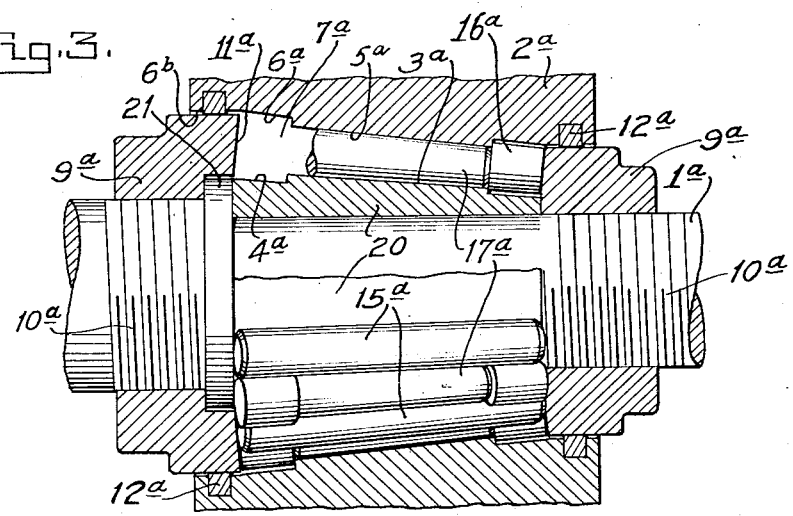
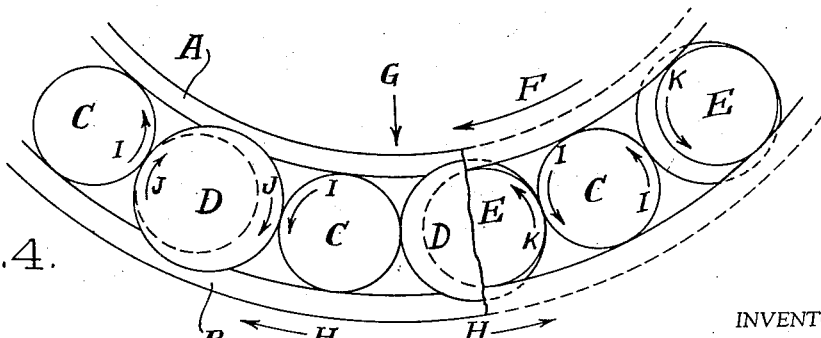
INVENTOR.
Jesse E. Hall
BY
R. W. Smith
ATTORNEY.

Patented Jan. 21, 1941

2,229,076

UNITED STATES PATENT OFFICE 2,229,076

ROLLER BEARING

Jesse E. Hall, Long Beach, Calif.

Application December 21, 1938, Serial No. 247,070

3 Claims. (Cl. 308—206)

This invention is a roller bearing, and has for its object to reduce frictional resistance to revolution of the rollers, maintain substantially uniform transverse spacing without mounting the rollers in a cage and with this spacing maintained at the load-supporting surfaces of the rollers even if they become worn, provide for lubricant in the transverse spacing between load-supporting surfaces of the rollers, and support the rollers so that transverse thrust at their load-supporting surfaces is not compounded along the juxtapositioned series of rollers.

More particularly, it is an object of the invention to transversely space load-carrying rollers by interposed idler rotatable-elements, with main portions of the load-carrying rollers supporting the load, and with the idler rotatable-elements and the interposed portions of the load-carrying rollers supporting no portion of the load. The load-supporting surfaces are thus uniformly transversely spaced even if they become worn, since the spacing is maintained by extending portions of the load-carrying rollers between the idler rotatable-elements, and these portions of the load-carrying rollers support no portion of the load and consequently are not subject to wear.

Furthermore, spacing the load-carrying rollers provides for lubricant between their proximate load-supporting surfaces, and transverse thrust at the said load-supporting surfaces is not compounded along the series of juxtapositioned rollers since the idler rotatable-elements, which maintain the transverse spacing, support no portion of the load.

Furthermore, frictional resistance to revolution of the load-carrying rollers is substantially eliminated, since the idler rotatable-elements (supporting no portion of the load) are free to revolve responsive to contact by those portions of the interposed load-carrying rollers which support no portion of the load. Relative rotation at the bearing revolves the load-carrying rollers in one direction, so that the interposed idler rotatable-elements are revolved in the opposite direction. The surfaces of the idler rotatable-elements and of the load-carrying rollers, which are in contact, thus support no portion of the load and move in the same direction, thereby eliminating frictional resistance at these contacting surfaces.

It is a still further object of the invention to provide additional load-carrying rollers between the load-supporting surfaces of those load-carrying rollers which are spaced by idler rotatable-elements, with the second mentioned load-carrying rollers free for transverse play relative to the idler rotatable-elements and each having slight transverse play between proximate load-carrying rollers of the first group. The load-supporting surfaces of the entire series of load-carrying rollers are thus substantially uniformly transversely spaced, in that each of the second mentioned load-carrying rollers is free for limited transverse play between next adjacent rollers of the first group, but the rollers of this first group are held against relative transverse play by the interposed idler rotatable-elements.

The idler rotatable-elements thus maintain substantially uniform spacing of the rollers of the two groups, even if their load-supporting surfaces become worn, with this spacing providing for lubricant between load-supporting surfaces of each pair of next adjacent rollers of the two groups. The idler rotatable-elements also support the load-carrying rollers so that transverse thrust at proximate load-supporting surfaces of next adjacent rollers of the two groups, is not compounded along the entire series of rollers, but is limited to transverse thrust of each roller of the second mentioned group against an adjacent roller of the first mentioned group and which is in turn held against lateral play by the interposed idler rotatable-elements.

Furthermore, frictional resistance between proximate load-supporting surfaces of rollers of the two groups is appreciably reduced, since the rollers of the second mentioned group are free for lateral play relative to the idler rotatable-elements and between rollers of the first group. Relative rotation at the bearing, revolves all the load-carrying rollers in the same direction, so that proximate load-supporting surfaces of next adjacent rollers of the two groups move in opposite directions relative to one another. But due to the transverse play permitted for rollers of the second mentioned group, the load-supporting surface of each of these rollers will clear the load-supporting surface of that roller of the first mentioned group which is at one side of said roller, when the diametrically opposite portion of the load-supporting surface of said roller contacts the load-supporting surface of the roller of the first mentioned group which is at its opposite side. Therefore, there is frictional contact at relatively moving surfaces of next adjacent rollers of the two groups, at only one of diametrically opposite sides of each roller, thereby substantially reducing frictional resistance over that which would result if the entire series of rollers were free for transverse play so as to crowd against one another at both of their diametrically opposite sides.

The invention also provides clearance space, in which extraneous matter such as abrasives which may be present with a lubricant for the bearing, may collect responsive to centrifugal force generated by rotation of the bearing, so as to clear the load-supporting surfaces of the load-carrying rollers.

Further objects of the invention will be readily understood from the following description of the accompanying drawing, in which:

Fig. 1 is an axial section through a radial bearing embodying the invention.

Fig. 2 is a transverse section on the line 2—2 of Fig. 1.

Fig. 3 is a view similar to Fig. 1, but showing a combination thrust and radial bearing.

Fig. 4 is a diagram showing relative movement of the rollers.

The bearing has a series of load-carrying rollers providing anti-frictional contact between relatively movable elements; and is shown as a bearing between relatively rotatable concentric elements.

At Figs. 1 and 2, the bearing is shown as a radial bearing between a rotatable shaft 1 and a stationary bearing housing 2, with the load-carrying rollers surrounding and preferably directly engaging the shaft 1 with no interposed inner raceway, and surrounded by and preferably directly engaging a bore of the bearing housing 2 with no interposed outer raceway.

The shaft 1 forms a cylindrical bearing surface 3 which at its ends is of slightly reduced diameter as shown at 4, providing clearance for idler rotatable-elements as hereinafter described. The bearing housing 2 has a cylindrical bore 5, counterbored at its ends as shown at 6, to provide clearance for the idler rotatable-elements. The inner end portions of the surfaces 4—6 are in transverse alinement, providing an annular space 7 therebetween.

Beyond its surfaces 4 the shaft is preferably of reduced diameter as shown at 8, corresponding to the diameter of the main portion of the shaft; and the portions 8 of the shaft are adapted for reception of retainer collars 9 which may be threaded onto the shaft as shown at 10. The inner ends of the retainer collars preferably surround the outer end portions of the surfaces 4 and are preferably received in the outer ends of the counterbores 6, thereby forming end abutments 11 for the spaces 7. Packing 12 may be provided between the retainer collars and the outer end portions of the counterbores 6.

Load-carrying rollers 15 are mounted between the cylindrical surfaces 3—5 and extend the length of said surfaces and into the annular spaces 7, with longitudinal displacement prevented by the end abutments 11. The rollers 15 engage the surfaces 3—5 and are adapted to revolve responsive to relative rotation of the shaft and its bearing housing, so as to provide anti-frictional radial bearings between these relatively rotatable parts.

Idler rotatable-elements shown as rollers 16 are mounted in the annular spaces 7, with one of these idler rollers between and contacting each pair of next adjacent load-carrying rollers 15. The idler rollers are of a diameter to clear the surfaces 4—6 so as to support no part of the load; and are thus free to revolve without frictional resistance, with the idler rollers thus maintaining uniform transverse spacing of the load-carrying rollers. Longitudinal displacement of the idler rollers is prevented by the end abutments 11 and by the shoulders at the inner ends of the surfaces 4—6.

In addition to those load-carrying rollers which are maintained in transversely spaced relation by the idler rollers 16, load-carrying rollers 17 are preferably mounted between the cylindrical surfaces 3—5, with one of the rollers 17 between each pair of next adjacent rollers 15. The rollers 17 extend the length of the surfaces 3—5, terminating so as to end-abut the idler rollers 16 which thus prevent longitudinal displacement of the rollers 17 while permitting their free lateral play relative to the idler rollers. In addition to the shoulders at the inner ends of the surfaces 4—6, the rollers 17 prevent longitudinal displacement of the idler rollers 16, the entire areas of the ends of the idler rollers having end abutment with either the shoulders of 4—6 or with the ends of the rollers 17. The rollers 17 are of the same diameter as the rollers 15, so as to engage the surfaces 3—5 and thus revolve responsive to relative rotation of the shaft and its bearing housing, so as to provide anti-frictional radial bearings between these relatively rotatable parts, which together with the rollers 15 uniformly distribute and support the entire load.

The idler rollers 16 maintain such transverse spacing of the rollers 15 that each of the rollers 17 is free for slight transverse play between next adjacent rollers 15; but the series of rollers 15—17 are maintained in substantially uniform transverse spacing, in that each of the rollers 17 is adapted for only limited transverse play between next adjacent rollers 15, and due to the idler rollers 16 there is no relative transverse movement of the rollers 15.

At Fig. 3 the bearing is shown as a combined radial and thrust bearing, between a rotatable shaft 1ª and a stationary bearing housing 2ª, with the load-carrying rollers surrounding a tapering raceway 20 which is mounted on the rotatable shaft, and surrounded by and preferably directly engaging a tapering bore of the bearing housing.

The raceway 20 is mounted on the shaft 1ª against a collar 21, and forms a frusto-conical bearing surface 3ª, which at its end is of slightly reduced diameter forming frusto-conical surfaces 4ª which provide clearance for idler rollers. The bearing housing 2a has a frusto-conical bore 5ª, which at its ends has frusto-conical counterbores 6ª providing clearance for the idler rollers. The inner end portions of the surfaces 4ª—6ª are in transverse alinement providing an annular frusto-conical space 7ª therebetween; and the cones which define the frustums of the various frusto-conical surfaces preferably have a common apex appreciably beyond one end of the roller bearing.

Beyond the collar 21, and also beyond the opposite end of the raceway 20, the shaft 1ª is threaded as shown at 10ª for reception of retainer collars 9ª. The inner end of that retainer collar which is adjacent the collar 21 preferably surrounds said collar, while the inner end of the opposite retainer collar abuts the end of the raceway 20. The inner ends of the retainer collars are preferably received in the outer ends of the counterbores 6ª, which outer ends of said counterbores are preferably cylindrical as shown at 6ᵇ; and the inner ends of the retainer collars thus form end abutments 11ª for the frusto-conical spaces 7ª. Packing 12ª may be provided between the retainer collars and the counterbores 6ᵇ.

Load-carrying rollers 15ᵃ are mounted between the frusto-conical surfaces 3ᵃ—5ᵃ, and extend the length of said surfaces and into the frusto-conical annular spaces 7ᵃ. The rollers 15ᵃ engage the surfaces 3ᵃ—5ᵃ, and for this purpose are slightly tapering rollers corresponding to the taper of the annular space in which they are received; and these rollers are thus adapted to revolve responsive to relative rotation of the shaft and its bearing housing, so as to provide auto-frictional combination thrust and radial bearings.

Idler rotatable-elements shown as rollers 16ᵃ are mounted in the frusto-conical annular spaces 7ᵃ, and conform to the taper of these spaces. One of the idler rollers is between and contacts each pair of next adjacent rollers 15ᵃ, with the idler rollers clearing the surfaces 4ᵃ—6ᵃ so that they support no part of the load and are thus free to revolve without frictional resistance. The idler rollers thus maintain uniform transverse spacing of the rollers 15ᵃ. The rollers 15ᵃ are held against longitudinal displacement by the end abutments 11ᵃ, and the idler rollers 16ᵃ are held against longitudinal displacement between the end abutments 11ᵃ and the shoulders at the inner ends of the surfaces 4ᵃ—6ᵃ.

A load-carrying roller 17ᵃ is preferably mounted between each pair of adjacent load-carrying rollers 15ᵃ; and the rollers 17ᵃ are tapering rollers received in and extending the length of the space between the surfaces 3ᵃ—5ᵃ, with longitudinal displacement of the rollers 17ᵃ prevented by their end abutment against the idler rollers 16ᵃ, and with the rollers 17ᵃ free for lateral play relative to the idler rollers. In addition to the shoulders at the inner ends of the surfaces 4ᵃ—6ᵃ, the rollers 17ᵃ prevent longitudinal displacement of the idler rollers 16ᵃ, the entire areas of the ends of the idler rollers having end abutment with either the shoulders of 4ᵃ—6ᵃ, or with the ends of the rollers 17ᵃ. The rollers 17ᵃ are of the same diameter as the rollers 15ᵃ so as to engage the surfaces 3ᵃ—5ᵃ and thus revolve responsive to relative rotation of the shaft and its bearing housing. The rollers 17ᵃ thus provide anti-frictional bearings which cooperate with the rollers 15ᵃ for uniformly distributing and supporting the load, both radially and longitudinally. The idler rollers 16ᵃ are of a diameter whereby the rollers 15ᵃ are so spaced that the rollers 17ᵃ are adapted for slight transverse play between next adjacent rollers 15ᵃ; but the rollers 15ᵃ are held against relative transverse movement by the idler rollers 16ᵃ, so that the series of rollers 15ᵃ—17ᵃ are maintained in substantially uniform transverse spacing.

The load-carrying and idler rollers being slightly angularly disposed to the axis of the shaft 1ᵃ, their end surfaces (which are perpendicular to the axes of the rollers) are slightly offset from perpendicular to the axis of the shaft; and the end abutments 11ᵃ and the shoulders at the inner ends of the surfaces 4ᵃ—6ᵃ are correspondingly offset from perpendicular to the axis of the shaft so as to provide flat end abutments for the rollers 15ᵃ—16ᵃ, and in similar manner the end surfaces of the rollers 16ᵃ—17ᵃ provide flat end abutment therebetween.

Movement of the rollers, as employed in either a radial or a combined radial and thrust bearing, will be understood by reference to Fig. 4. The relatively rotating parts, e. g. a shaft and a bearing housing, are shown at A and B, the load-carrying rollers which are spaced by idler rotatable elements are shown at C, the idler rotatable elements are shown as rollers D, and the load-carrying rollers which are preferably mounted between next adjacent rollers C are shown at E. Rotation of the shaft A is assumed to be in the direction of arrow F, with the load exerted in the direction of arrow G and thus tending to circumferentially shift the rollers as shown by arrows H.

Rotation of the shaft A thus revolves the rollers C in the direction of arrows I, thereby tending to revolve the idler rollers D in the direction of arrows J, with relative transverse movement of the rollers C prevented by their contact with the interposed rollers D. Since the rollers D carry no part of the load they are free to revolve in the direction of arrows J, and the contacting surfaces of the rollers C—D thus move in the same direction as shown by each pair of proximate arrows I—J, thereby eliminating substantially all frictional resistance at these contacting surfaces. Uniform transverse spacing of rollers C is thus maintained by the rollers D, with substantially no frictional resistance to revolution of the rollers C.

The rollers E revolve in the same direction as the rollers C, as shown by arrows K. The proximate surfaces of rollers C—E thus move in opposite directions relative to one another as indicated by each pair of proximate arrows I—K. Each roller E is free for slight transverse play between proximate rollers C, but the rollers C are held against relative transverse movement by the rollers D. Therefore each roller E is adapted to contact that roller C which is transversely beyond the roller E in the direction in which the load tends to transversely shift the rollers as indicated by arrows H, thereby transversely spacing each roller E from that roller C which is transversely beyond its opposite side. Frictional resistance at relatively oppositely moving proximate surfaces of adjacent rollers E—C is thus limited to frictional resistance at one side of each roller, the opposite side of each roller being clear of contact with the proximate roller. The rollers E are thus adapted for slight transverse play, but due to the rollers C being held against relative transverse movement the entire series of rollers C—E are maintained in substantially uniform spacing with frictional resistance to revolution of the roller at only one side of each roller.

The invention thus appreciably reduces frictional resistance to revolution of the rollers of a bearing, with the rollers maintained in substantially uniform spacing without mounting the rollers in a cage.

The absence of a cage, while maintaining transverse spacing of the rollers, provides unobstructed spaces between proximate surfaces of next adjacent rollers, adapted for reception of a lubricant so as to maintain a film of lubricant between next adjacent rollers. The spacing of load-carrying rollers by interposed idler rotatable-elements, with the idler rotatable-elements and the interposed ends of the load-carrying rollers received in clearance spaces, maintains transverse spacing of the load-carrying rollers even when they have become worn, since the wear is at the medial, load-supporting portions of the load-carrying rollers while the idler rotatable-elements and the interposed ends of the load-carrying rollers are not subject to wear and thus maintain the original spacing of the load-carrying rollers.

The annular clearance spaces surrounding the ends of the rollers provide for reception of extraneous matter such as abrasives, which may be present with the lubricant which is used for the bearing. Responsive to rotation of the bearing, centrifugal force tends to project such abrasives radially beyond the lubricant, and seeking the path of least resistance such abrasives will work their way along the load-carrying rollers, and at the ends of the rollers such abrasives are centrifugally projected for collection in the annular clearance spaces which surround the idler rotatable-elements. The collected abrasives thus clear the load-supporting surfaces of the rollers, thereby eliminating excessive wear.

I claim:

1. In a roller bearing, a series of load-carrying rollers, idler rotatable-elements between proximate load-carrying rollers of said series, and a series of load-carrying rollers between proximate load-carrying rollers of the first mentioned series, the load-carrying rollers of the second mentioned series being free for lateral play between and within limits determined by their lateral engagement with proximate load-carrying rollers of the first mentioned series.

2. In a roller bearing, a series of load-carrying rollers, idler rotatable-elements between proximate load-carrying rollers of said series, and a series of load-carrying rollers between proximate load-carrying rollers of the first mentioned series, the idler rotatable-elements having ends which are solid throughout the areas defined by the diameters of said elements, the load-carrying rollers of the second mentioned series terminating so as to end abut said solid ends of the idler rotatable-elements and being free for lateral play relative to and clear of lateral engagement with the idler rotatable-elements and between and within limits determined by their lateral engagement with proximate load-carrying rollers of the first mentioned series.

3. In a roller bearing, concentric relatively rotatable parts having an annular bearing space therebetween, the annular bearing space having ends forming radial clearance spaces with shoulders of the relatively rotatable parts at the inner ends of said clearance spaces, a series of load-carrying rollers in said bearing space and engaging the relatively rotatable parts, the series of load-carrying rollers extending into said clearance spaces, idler rotatable-elements between proximate load-carrying rollers of said series, the idler rollers being in said clearance spaces radially clear of the relatively rotatable parts, and a series of load-carrying rollers between proximate load-carrying rollers of the first mentioned series, the second mentioned series of load-carrying rollers being in said bearing space and engaging the relatively rotatable parts and terminating short of said clearance spaces, the idler rotatable-elements spacing the load-carrying rollers of the first mentioned series distances greater than diameters of the load-carrying rollers of the second mentioned series, the idler rotatable-elements having ends which are solid throughout the areas defined by the diameters of said elements, the entire areas of the solid ends of the idler rotatable-elements abutting the ends of the load-carrying rollers of the second mentioned series and the shoulders of the relatively rotatable parts, and the load-carrying rollers of the second mentioned series being free for lateral play relative to and clear of lateral engagement with the idler rotatable-elements and between and within limits determined by their lateral engagement with proximate load-carrying rollers of the first mentioned series.

JESSE E. HALL.